United States Patent
Li et al.

(10) Patent No.: US 12,363,727 B2
(45) Date of Patent: Jul. 15, 2025

(54) DATA TRANSMISSION METHOD, APPARATUS AND SYSTEM

(71) Applicant: ZTE CORPORATION, Shenzhen (CN)

(72) Inventors: Xincai Li, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 556 days.

(21) Appl. No.: 17/760,732

(22) PCT Filed: Sep. 11, 2020

(86) PCT No.: PCT/CN2020/114777
§ 371 (c)(1),
(2) Date: Mar. 15, 2022

(87) PCT Pub. No.: WO2021/052254
PCT Pub. Date: Mar. 25, 2021

(65) Prior Publication Data
US 2022/0346126 A1    Oct. 27, 2022

(30) Foreign Application Priority Data
Sep. 16, 2019   (CN) .......................... 201910871822.X

(51) Int. Cl.
*H04W 72/23*    (2023.01)
*H04W 74/0808*  (2024.01)

(52) U.S. Cl.
CPC ....... *H04W 72/23* (2023.01); *H04W 74/0808* (2013.01)

(58) Field of Classification Search
CPC ................................................. H04W 74/0808
See application file for complete search history.

(56) References Cited

U.S. PATENT DOCUMENTS

| | | | |
|---|---|---|---|
| 2011/0026471 A1* | 2/2011 | Miki | H04B 1/713 375/132 |
| 2017/0230962 A1 | 8/2017 | Park et al. | |

(Continued)

FOREIGN PATENT DOCUMENTS

| | | |
|---|---|---|
| CN | 105309030 A | 2/2016 |
| CN | 105556888 A | 5/2016 |

(Continued)

OTHER PUBLICATIONS

International Search Report for Application No. PCT/CN2020/114777, dated Dec. 10, 2020, 6 pages including English translation.

(Continued)

*Primary Examiner* — James P Duffy
(74) *Attorney, Agent, or Firm* — Morgan, Lewis & Bockius LLP

(57) ABSTRACT

Provided are a data transmission method, apparatus and system. The data transmission method includes: configuring transmission resource configuration information, where the transmission resource configuration information includes configuration information about k RUs, each RU includes N subcarriers and M consecutive slots, and k, N, and M are integers greater than or equal to 1; and scheduling, through downlink control signaling, a transmission of at least one data transmission channel over the k RUs indicated by the transmission resource configuration information.

13 Claims, 7 Drawing Sheets

---

Configure transmission resource configuration information, where the transmission resource configuration information includes configuration information about k RUs, each RU includes N subcarriers and M consecutive slots, and k, N, and M are integers greater than or equal to 1 — S2010

Send the transmission resource configuration information to a UE, where the transmission resource configuration information further includes at least one of: configuration information about RUs within one COT, information about an access type of a data transmission channel, or information about a spatial direction of the data transmission channel — S2020

Schedule at least one data transmission channel through downlink control signaling for a transmission over the k RUs indicated by the transmission resource configuration information — S2030

(56) References Cited

U.S. PATENT DOCUMENTS

| | | | |
|---|---|---|---|
| 2018/0242232 A1 | 8/2018 | Chendamarai Kannan et al. | |
| 2019/0059020 A1 | 2/2019 | Ge et al. | |
| 2019/0141693 A1 | 5/2019 | Guo et al. | |
| 2019/0373635 A1* | 12/2019 | Yang | H04B 7/0408 |
| 2021/0127409 A1 | 4/2021 | Park et al. | |
| 2021/0394108 A1 | 12/2021 | Pietschner et al. | |

FOREIGN PATENT DOCUMENTS

| | | |
|---|---|---|
| CN | 107888256 A | 4/2018 |
| CN | 108811105 A | 11/2018 |
| CN | 109039556 A | 12/2018 |
| CN | 110536453 A | 12/2019 |
| WO | WO 2019/039860 A1 | 2/2019 |
| WO | WO 2019/137057 A1 | 7/2019 |

OTHER PUBLICATIONS

Extended European Search Report of Application No. 20864420.3, dated Sep. 19, 2023, 11 pages.
NTT DOCOMO, Inc., "Presentation of Specification/Report to TSG: TR 38.802, Version 2.0.0", 3GPP TSG-RAN Meeting #75, RP-170377, Dubrovnik, Croatia, Mar. 6-9, 2017, 135 pages.
Chinese Office Action for Application No. 201910871822.X, dated Feb. 5, 2023, 14 pages including translation.
Chinese Search Report for Application No. 201910871822.X, dated Jan. 31, 2023, 6 pages including translation.

* cited by examiner

Receive downlink control signaling sent by a base station, where the downlink control signaling is configured to schedule at least one data transmission channel for a transmission over k resource units (RUs) indicated by transmission resource configuration information, the transmission resource configuration information includes configuration information about the k RUs, each RU includes N subcarriers and M consecutive slots, and k, N, and M are integers greater than or equal to 1 ⟶ S12010

Transmit the at least one data transmission channel over the k RUs indicated by the transmission resource configuration information according to the scheduling of the downlink control signaling ⟶ S12020

FIG. 12

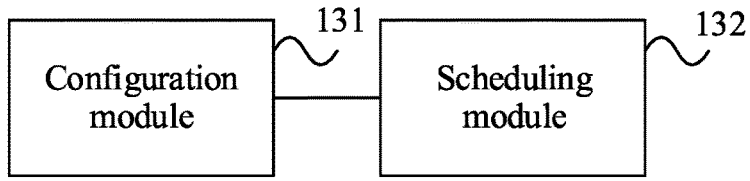

FIG. 13

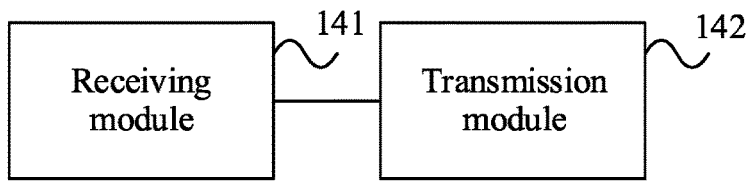

FIG. 14

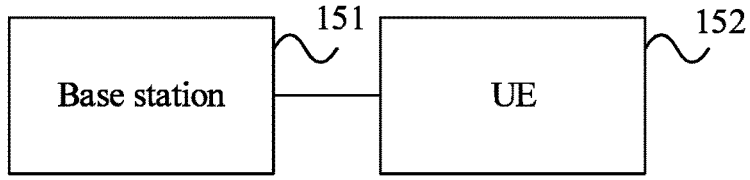

FIG. 15

DATA TRANSMISSION METHOD, APPARATUS AND SYSTEM

CROSS-REFERENCES TO RELATED APPLICATIONS

This is a National Stage Application, filed under 35 U.S.C. 371, of International Patent Application No. PCT/CN2020/114777, filed on Sep. 11, 2020, which is based on and claims priority to Chinese Patent Application No. 201910871822.X filed with the China National Intellectual Property Administration (CNIPA) on Sep. 16, 2019, the disclosure of which is incorporated herein by reference in its entirety.

TECHNICAL FIELD

The present application relates to a wireless communication network, for example, a data transmission method, apparatus, and system.

BACKGROUND

The 5th generation mobile communication (5G) will meet traffic requirements of human beings in the fields of residence, work, health care, education, and the like. A high capacity and high data transmission efficiency are important features of 5G which may not only improve the quality of voice and video communication but also provide enhancements for many new services such as Internet of Things (IoT) and autonomous driving. However, spectrum resources for communication are limited, and most low-frequency spectra have been applied to communication traffic. Therefore, it is considered that the subsequent evolution may merely be performed on higher frequency bands.

High-frequency bands typically use high subcarrier spacings (SCSs) for the resistance of multipath fading. The higher an SCS, the shorter a corresponding slot. If a data transmission is still scheduled based on an original slot granularity, data transmission efficiency will be very low.

SUMMARY

The present application provides a data transmission method, apparatus, and system for improving data transmission efficiency.

Embodiments of the present application provide a data transmission method applied to a base station. The method includes the following.

Transmission resource configuration information is configured, where the transmission resource configuration information includes configuration information about k RUs, each RU includes N subcarriers and M consecutive slots, and k, N, and M are integers greater than or equal to 1.

At least one data transmission channel is scheduled through downlink control signaling for a transmission over the k RUs indicated by the transmission resource configuration information.

Embodiments of the present application provide a data transmission method applied to a UE. The method includes the following.

Downlink control signaling sent by a base station is received, where the downlink control signaling is used for scheduling at least one data transmission channel for a transmission over k RUs indicated by transmission resource configuration information, the transmission resource configuration information includes configuration information about the k RUs, each RU includes N subcarriers and M consecutive slots, and k, N, and M are integers greater than or equal to 1.

The at least one data transmission channel is transmitted over the k RUs indicated by the transmission resource configuration information according to the scheduling of the downlink control signaling.

Embodiments of the present application provide a data transmission apparatus disposed in a base station and including a configuration module and a scheduling module.

The configuration module is configured to configure transmission resource configuration information, where the transmission resource configuration information includes configuration information about k RUs, each RU includes N subcarriers and M consecutive slots, and k, N, and M are integers greater than or equal to 1.

The scheduling module is configured to schedule, through downlink control signaling, a transmission of at least one data transmission channel over the k RUs indicated by the transmission resource configuration information.

Embodiments of the present application provide a data transmission apparatus disposed in a UE and including a receiving module and a transmission module.

The receiving module is configured to receive downlink control signaling sent by a base station, where the downlink control signaling is used for scheduling a transmission of at least one data transmission channel over k RUs indicated by transmission resource configuration information, the transmission resource configuration information includes configuration information about the k RUs, each RU includes N subcarriers and M consecutive slots, and k, N, and M are integers greater than or equal to 1.

The transmission module is configured to transmit the at least one data transmission channel over the k RUs indicated by the transmission resource configuration information according to the scheduling of the downlink control signaling.

Embodiments of the present application provide a data transmission system including a base station and a UE.

The base station includes any data transmission apparatus disposed in the base station.

The UE includes any data transmission apparatus disposed in the UE.

BRIEF DESCRIPTION OF DRAWINGS

FIG. 12 is a flowchart of another data transmission method according to an embodiment;

FIG. 13 is a structural diagram of a data transmission apparatus according to an embodiment;

FIG. 14 is a structural diagram of another data transmission apparatus according to an embodiment;

FIG. 15 is a structural diagram of a data transmission system according to an embodiment;

DETAILED DESCRIPTION

Embodiments of the present application are described hereinafter in detail in conjunction with the drawings.

Spectrum resources are important resources in a wireless communication system. Most low-frequency spectrum resources are occupied by communication traffic. Therefore, the evolution of the wireless communication system may be considered to be performed on higher frequency bands. On high-frequency bands, such as those of higher than 60 GHz, high SCSs are typically used for the resistance of multipath fading, such as 240 kHz, 480 kHz, 960 kHz, and 1920 kHz. However, the higher an SCS, the shorter the corresponding slot. For example, the slot corresponding to an SCS of 15 kHz is 1 ms, and the slot corresponding to an SCS of 480 kHz merely has a length of 0.03125 ms. If data scheduling and transmissions are still performed based on an original slot granularity, data transmission efficiency will be very low. Therefore, in the embodiments of the present application, a larger scheduling unit is introduced for scheduling a data transmission, that is, a resource unit (RU), thereby improving the data transmission efficiency.

Figure 1:
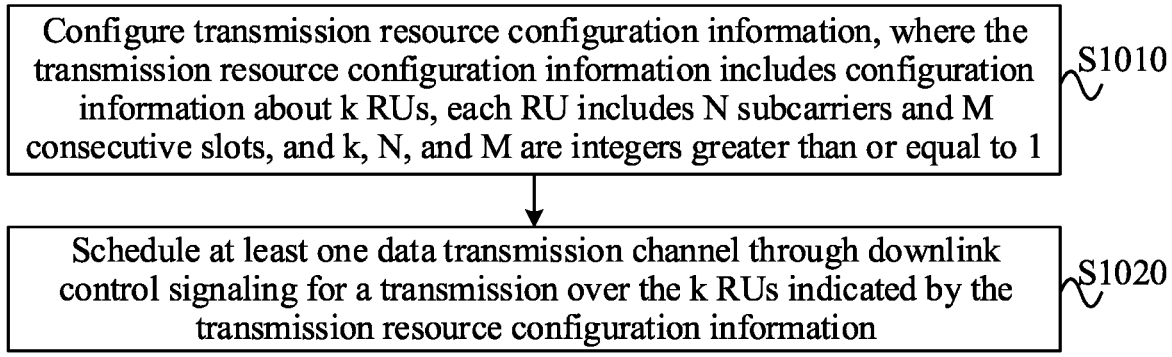
FIG. 1 is a flowchart of a data transmission method according to an embodiment.

FIG. 1 is a flowchart of a data transmission method according to an embodiment. As shown in FIG. 1, the method provided by this embodiment includes the following.

In S1010, transmission resource configuration information is configured, where the transmission resource configuration information includes configuration information about k RUs, each RU includes N subcarriers and M consecutive slots, and k, N, and M are integers greater than or equal to 1.

The data transmission method provided by this embodiment is applied to a base station in a wireless communication system. In the wireless communication system, the base station schedules transmission resources and indicates transmission resources used for an uplink data transmission channel or a downlink data transmission channel.

When an increasingly high frequency is used for wireless communication, a larger SCS needs to be used so as to resist multipath channel fading. However, the larger SCS means a shorter slot, and the data transmission is scheduled with very low efficiency when performed using a very short slot. Therefore, in this embodiment, a new data scheduling unit, an RU, is used. Each RU includes the N subcarriers and the M consecutive slots, and k, N, and M are the integers greater than or equal to 1. That is, each RU is a data scheduling unit includes multiple basic transmission units in a time domain and a frequency domain. Values of N and M are determined according to an SCS, a property and an occasion of a scheduled carrier, or a traffic type. The base station may configure the number of consecutive slots included in each RU and the number of subcarriers included in each RU in a predefinition manner or in a manner of configuration through radio resource control (RRC) signaling. In a non-high-frequency case, the new data scheduling unit, the RU, may also be used. The transmission resource configuration information includes the configuration information about the k RUs. The k RUs may be configured independently or within one channel occupancy time (COT).

Boundaries of slots for different SCSs are aligned within 1 ms. For example, the number of consecutive slots and the number of subcarriers included for different SCSs are shown in Table 1 below.

TABLE 1

| SCS (kHz) | Number of slots included in one RU | Number of subcarriers included in one RU |
| --- | --- | --- |
| 120 | 2 | 12 |
| 240 | 4 | 6 |
| 480 | 8 | 3 |
| 960 | 16 | 2 |
| 1920 | 32 | 1 |

In S1020, at least one data transmission channel is scheduled through downlink control signaling for a transmission over the k RUs indicated by the transmission resource configuration information.

After the transmission resource configuration information is configured, the at least one data transmission channel may be scheduled by the base station through the downlink control signaling for the transmission over the k RUs indicated by the transmission resource configuration information. For example, the downlink control signaling may be downlink control information (DCI). The data transmission channel scheduled by the DCI includes one of: a physical uplink shared channel (PUSCH), a physical downlink shared channel (PDSCH), a physical uplink control channel (PUCCH), a physical downlink control channel (PDCCH), or a synchronization signal block (SSB). One PUSCH/PDSCH or multiple PUSCHs/PDSCHs may be scheduled by the DCI, or one PUSCH/PDSCH is scheduled by the DCI to be repeatedly sent. That is, one RU may transmit one PUSCH/PDSCH, or one PUSCH/PDSCH may transmit multiple RUs. Since the transmission resource configuration information includes the configuration information about the k RUs, the at least one data transmission channel is scheduled through the downlink control signaling for the transmission over the k RUs indicated by the transmission resource configuration information so that the transmission of the data transmission channel can be flexibly scheduled in a high-frequency scenario without being limited by a size of the slot, thereby improving data transmission efficiency.

The data transmission method provided by this embodiment is applied to the base station. Firstly, the transmission resource configuration information is configured, where the transmission resource configuration information includes the configuration information about the k RUs, each RU includes the N subcarriers and the M consecutive slots, and k, N, and M are the integers greater than or equal to 1. Then, the at least one data transmission channel is scheduled through the downlink control signaling for the transmission over the k RUs indicated by the transmission resource configuration information. Thus, the transmission of the data transmission channel can be flexibly scheduled in the high-frequency scenario without being limited by the size of the slot, thereby improving the data transmission efficiency.

Figure 2:
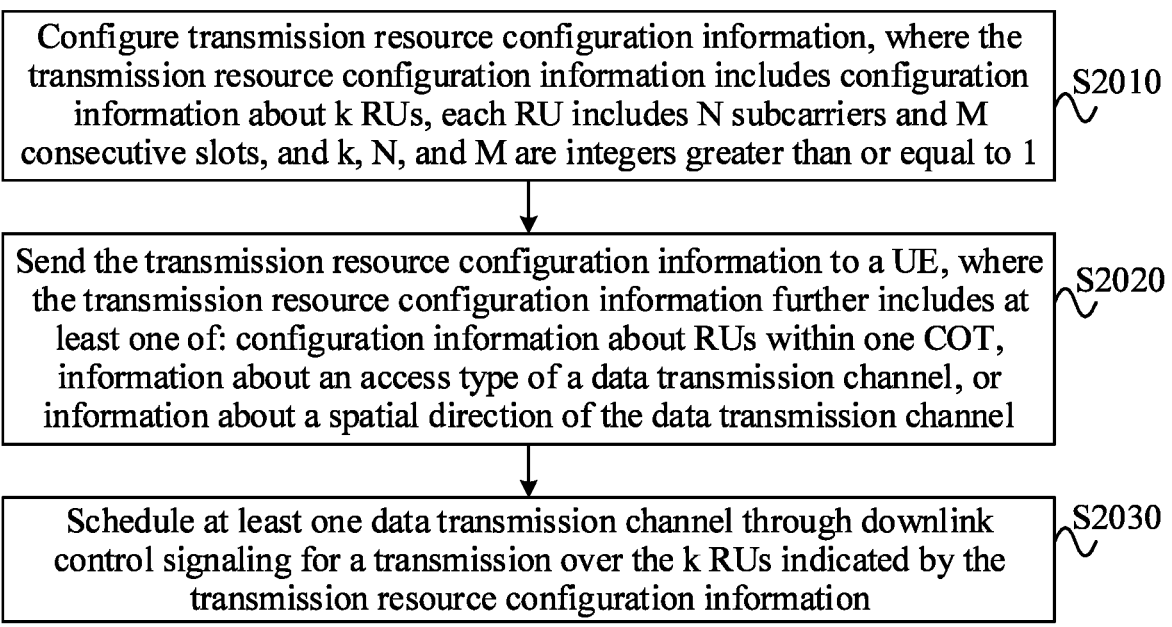
FIG. 2 is a flowchart of another data transmission method according to an embodiment.

FIG. 2 is a flowchart of another data transmission method according to an embodiment. As shown in FIG. 2, the method provided by this embodiment includes the following.

In S2010, transmission resource configuration information is configured, where the transmission resource configuration information includes configuration information about k resource units (RUs), each RU includes N subcarriers and M consecutive slots, and k, N, and M are integers greater than or equal to 1.

In S2020, the transmission resource configuration information is sent to a UE, where the transmission resource configuration information further includes at least one of: configuration information about RUs within one COT, information about an access type of a data transmission channel, or information about a spatial direction of a data transmission channel.

Each PUSCH or PDSCH may be sent in multiple beam directions at a certain occasion or may be sent in different beam directions at different occasions. A station (e.g. a base station or the user equipment (UE)) performs Listen Before Talk (LBT) before sending the PUSCH or the PDSCH and may send the PUSCH or the PDSCH in a corresponding direction after the LBT succeeds. To enable the UE to correctly perform the LBT after the RUs are configured, the base station needs to send the transmission resource configuration information to the UE. The transmission resource configuration information includes at least one of: the configuration information about the RUs within the one COT, the information about the access type of the data transmission channel, or the information about the spatial direction of the data transmission channel. The information about the access type of the data transmission channel includes at least one of: omni-directional LBT with random backoff, omni-directional LBT without random backoff, directional LBT with random backoff, or directional LBT without random backoff. The information about the spatial direction of the data transmission channel includes a beam direction corresponding to the data transmission channel.

In an embodiment, for an unlicensed carrier, different RU scheduling granularities may be used for the improvement of a probability of channel access. A time length occupied by a preset number of preceding RUs within the one COT is less than a time length occupied by other RUs within the one COT. For example, the preceding RUs within the one COT may include a relatively small number of slots, or a scheduling granularity is relatively dense. For a middle part of the one COT, scheduled RUs include a relatively large number of slots, and the scheduling granularity is relatively sparse. For a rear remaining part of the COT, the scheduled RUs may include a relatively small number of slots for sending complete RUs.

For example, the base station implements the preceding RU scheduling of non-uniform resources by a method described below.

Firstly, the base station configures an end boundary of an end slot of each RU within the COT through RRC signaling. For example, the end boundary of the end slot may be configured through a slot bitmap. In this manner, different RUs include different numbers of slots, that is, some RUs each include two slots, some RUs each include three slots, and some RUs each include six slots.

Figure 3:
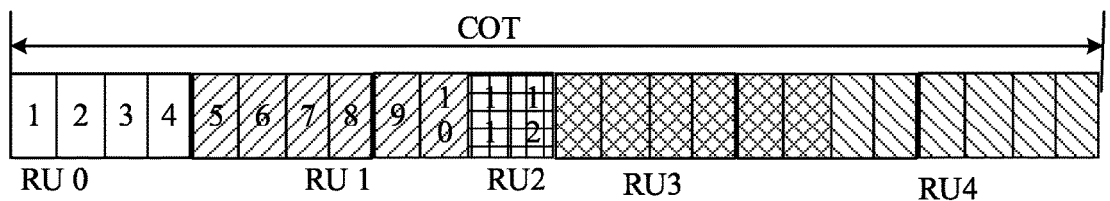
FIG. 3 is a diagram showing a configuration of RUs within one COT.

For example, the base station may configure a pattern of RUs within a certain COT through the RRC signaling 000100000101, where the first RU occupies four slots, the second RU occupies six slots, and the third RU occupies two slots. As shown in FIG. 3 which is a diagram showing a configuration of RUs within one COT, RU2 in the middle, a short time domain resource, is designed to be reserved for the data scheduling and transmission of unexpected and emergent Ultra-Reliable Low-Latency Communications (URLLC) traffic.

Then, the base station may indicate through DCI an absolute index and the number of a start RU occupied by a scheduled PUSCH/PDSCH.

In an embodiment, the transmission resource configuration information further includes configuration parameter information about a data transmission channel related to configuration information about RUs, where the configuration parameter information includes one of timing information about the data transmission channel related to the configuration information about the RUs, time domain resource allocation information about the data transmission channel related to the configuration information about the RUs, or codebook information about the data transmission channel related to the configuration information about the RUs.

For a high frequency, when a scheduling unit is an RU, units of some relevant timing parameters also need to be modified, such as the definition of relevant timing quantities. For example, a timing K0 between the DCI and the scheduled PDSCH, a timing K1 corresponding to the PDSCH and a Hybrid Automatic Repeat Request Acknowledgement (HARQ-ACK) fed back by the UE, and a timing K2 between the DCI and the scheduled PUSCH are all indicated using the RU as a unit instead of using the original slot as the unit. A number indicated in the DCI, that is, a value of K1, is the number of RUs between an RU including the PDSCH and an RU including a PUCCH. In addition, values in a table of time domain resource allocation in the DCI also need to be redefined, and units of values corresponding to K0 and K2 are the number of RUs. In the case where the RU is the scheduling unit, a sum of a start symbol S of the scheduled PUSCH/PDSCH and a transmission length L may exceed fourteen symbols, that is, exceed one slot. Meanwhile, an HARQ-ACK codebook corresponding to the PDSCH is also constructed using the RU as the unit.

In an embodiment, different CBGs of one transport block (TB) in one data transmission channel are transmitted in different slots of one RU.

Figure 4:
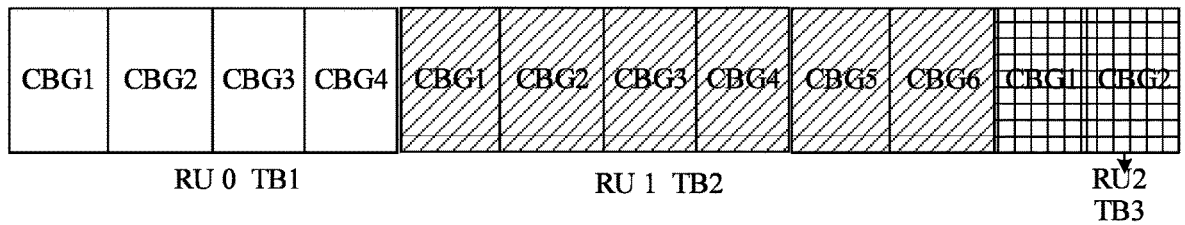
FIG. 4 is a diagram illustrating that scheduled CBGs of one TB are transmitted within an RU.

The scheduling method includes: scheduling one transport block (TB) to be transmitted across boundaries of slots, where each code block group (CBG) of the TB occupies one or more slots. One LBT opportunity exists at a transmission boundary of each CBG, and remaining CBGs of the TB are sent after LBT succeeds. As shown in FIG. 4 which is a diagram illustrating that scheduled CBGs of one TB are transmitted within an RU, the base station schedules three TBs for transmissions over three RUs respectively. A transmission of each TB or each RU has a different time domain length. The first TB includes four CBGs and each CBG occupies one or two slots. The second TB includes six CBGs and each CBG occupies one or two slots. The third TB includes two CBGs and each CBG occupies one or two slots. For a demodulation reference signal (DMRS), the RU is also used as an allocation unit, that is, multiple slots may share the DMRS.

In an embodiment, for the first TB scheduled, a CBG which cannot be sent due to an LBT failure is scheduled and retransmitted by methods described below.

A CBG scheduled and sent in a spatial direction in which the LBT fails is retransmitted in a spatial direction in which the LBT succeeds. Alternatively, the CBG scheduled and sent in the spatial direction in which the LBT fails is retransmitted in a new time domain of the COT. Alternatively, the CBG scheduled and sent in the spatial direction in which the LBT fails is retransmitted on a sub-band where the LBT succeeds within the COT.

For example, at a certain occasion, the base station schedules TB1 of the UE for a data transmission over RU1, and different CBGs of TB1 occupy different slots of RU1. However, since the UE needs to perform the LBT before sending data, the LBT may not succeed before the UE sends CBG1.

If preceding CBGs of a TB scheduled by the unlicensed carrier cannot be sent because of the LBT, the preceding CBGs are transmitted in a subsequent RU. Specifically, a predefinition manner may be used, that is, it is specified that the CBGs which cannot be sent are transmitted in an (n+2)-th RU.

Figure 5:
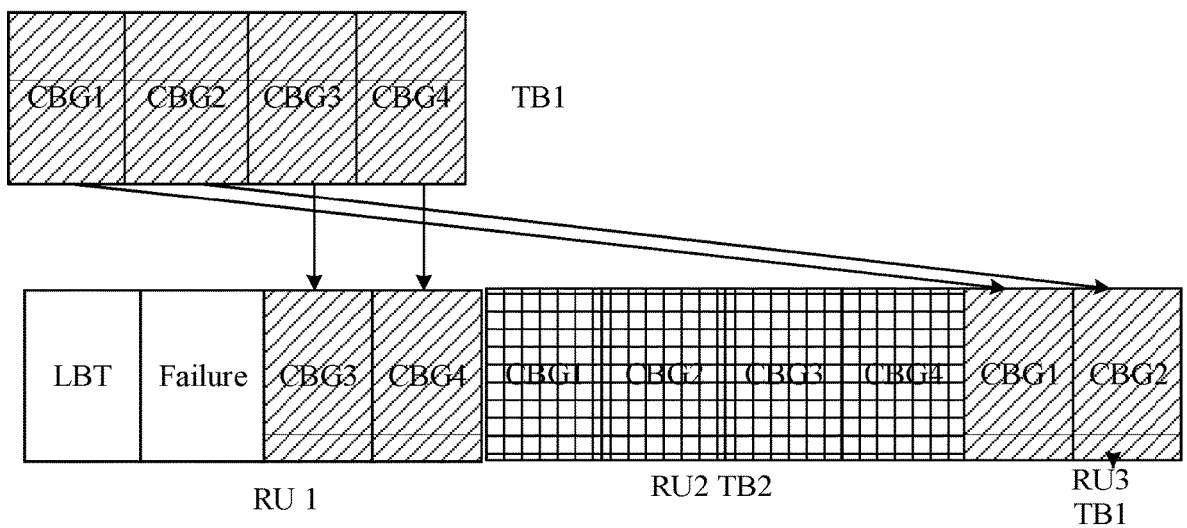
FIG. 5 is a diagram illustrating that CBGs are retransmitted in a new time domain after LBT fails.

Alternatively, the base station indicates through dynamic signaling a new time domain position for the CBGs which are not sent. As shown in FIG. 5 which is a diagram illustrating that CBGs are retransmitted in a new time domain after LBT fails, since LBT for TB1 fails, CBG1 and CBG2 of TB1 are not successfully sent and then CBG1 and CBG2 of TB1 will be retransmitted in slots after TB2.

Figure 6:
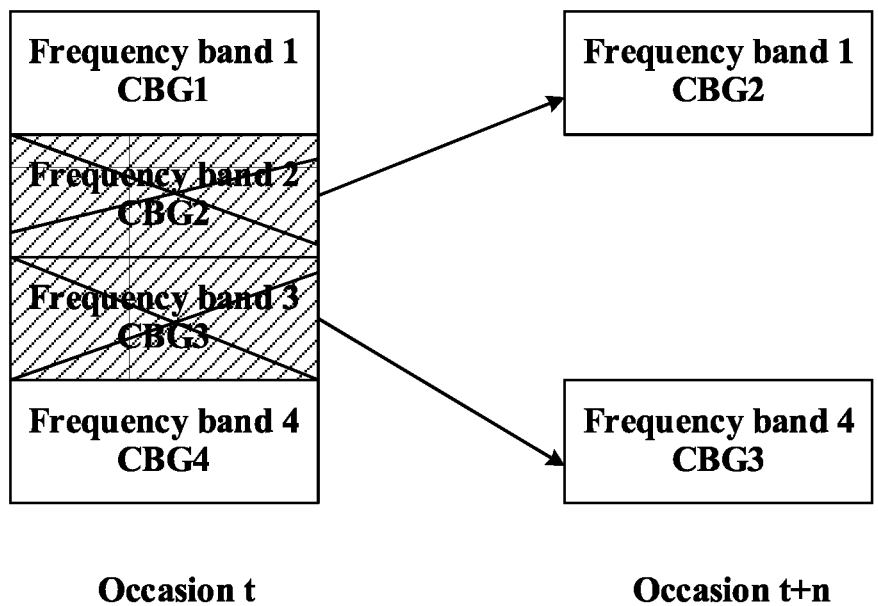
FIG. 6 is a diagram illustrating that CBGs are retransmitted in a new frequency domain after LBT fails.

Alternatively, the base station preschedules multiple CBGs to be sent at multiple frequency domain positions. Then the CBGs which cannot be sent are sent at a position of the sub-band where the LBT succeeds. As shown in FIG. 6 which is a diagram illustrating that CBGs are retransmitted in a new frequency domain after LBT fails, CBGs 1 to 4 are transmitted on frequency bands 1 to 4, respectively, and LBT for frequency band 2 and frequency band 3 fails so that CBG2 and CBG3 are not successfully transmitted and thus are retransmitted on frequency band 1 and frequency band 4, respectively.

Figure 7:
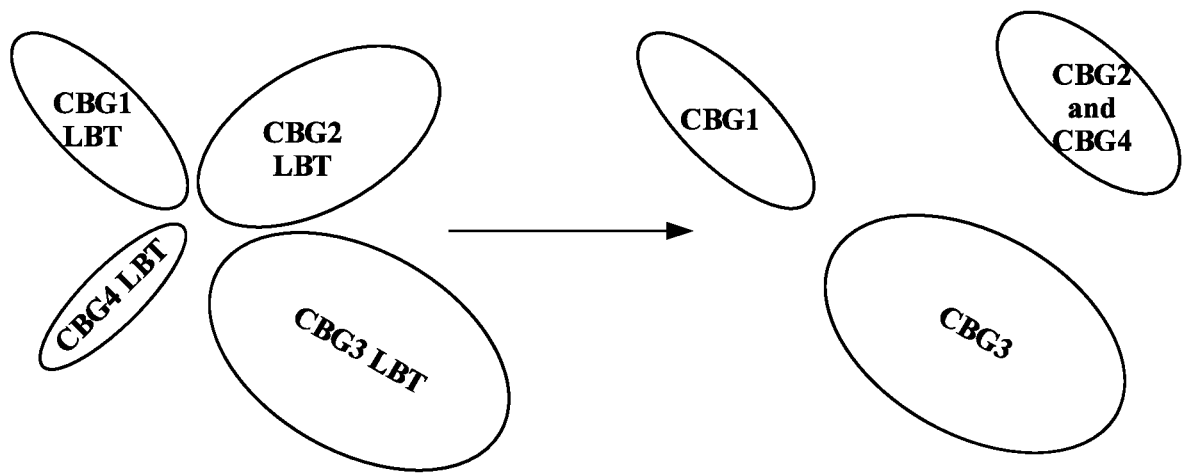
FIG. 7 is a diagram illustrating that after LBT fails, CBGs are retransmitted in a direction in which the LBT succeeds.

Alternatively, the base station reschedules CBG1 and CBG2 in a beam direction in which the LBT succeeds. As shown in FIG. 7 which is a diagram illustrating that after LBT fails, CBGs are retransmitted in a direction in which the LBT succeeds, LBT in beam directions corresponding to CBG2 and CBG3 fails, and CBG2 and CBG3 may be retransmitted in a beam direction of CBG1 in which the LBT succeeds.

In S2030, at least one data transmission channel is scheduled through downlink control signaling for a transmission over the k RUs indicated by the transmission resource configuration information.

In an embodiment, the base station provides a manner of LBT performed before the data transmission channel is sent in the DCI for scheduling the data transmission channel. For example, the base station may indicate one of the preceding four types of LBT through 2 bits in the DCI.

In an embodiment, a direction of directional LBT is the same as or covers a beam direction of a data transmission scheduled each time, which is specifically determined through a spatial information parameter or a reference signal resource.

In an embodiment, to improve a probability of the data transmission and reduce the number of times the LBT is performed, multiple RUs have the same beam direction. Once the UE successfully performs the LBT, the multiple RUs can be continuously transmitted, and the base station provides merely one sounding reference signal (SRS) resource indicator (SRI) in the DCI.

Figure 8:
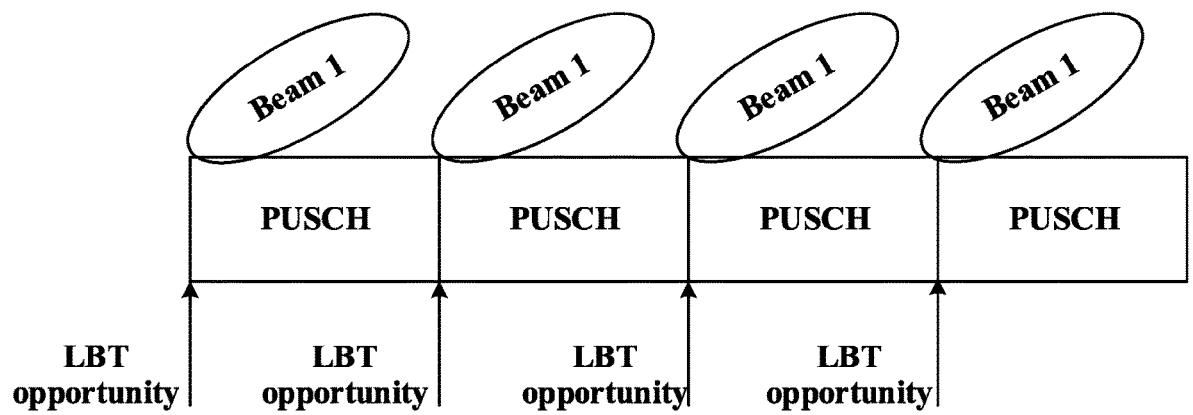
FIG. 8 is a diagram showing LBT when multiple data transmission channels having the same direction are scheduled by DCI.

In an embodiment, when multiple PUSCHs have the same beam direction, the station performs the LBT in the beam direction once before the data is sent and continuously transmits the scheduled multiple RUs after the LBT succeeds, as shown in FIG. 8 which is a diagram showing LBT when multiple data transmission channels having the same direction are scheduled by DCI.

When the multiple PUSCHs have different transmission beam directions, that is, the base station provides multiple SRIs in the DCI, the station performs omni-directional LBT once and continuously sends the data in multiple beam directions after the omni-directional LBT succeeds. In addition, to increase a probability of an LBT success of the data, the base station may preschedule multiple beam directions, and the UE may successively perform the LBT in the multiple beam directions according to priorities. A beam is sent if the LBT succeeds in a direction of the beam.

In an embodiment, in the case where the LBT is performed for data transmissions within the one COT and in multiple beam directions and the base station and the UE shares the COT, different stations may perform the LBT in multiple manners.

When one station (including the base station and the subordinate UE of the base station) performs multiple non-consecutive data transmissions within one COT and beam directions of the multiple transmissions are the same or different, a manner of the LBT performed before each data transmission within the one COT may be determined by the station in one of manners described below.

Manner one: the base station performs the omni-directional LBT with the random backoff once at the beginning of the COT and then initiates one COT after the omni-directional LBT with the random backoff succeeds; and subsequently, the base station or the subordinate UE of the base station uses the directional LBT without the random backoff before the data transmission within the COT.

Manner two: the base station performs the omni-directional LBT with the random backoff once at the beginning of the COT and then initiates one COT after the omni-directional LBT with the random backoff succeeds; and subsequently, the base station or the subordinate UE of the base station uses the directional LBT with the random backoff before the data transmission within the COT.

Manner three: the base station or the UE performs the directional LBT with the random backoff once at the beginning of the COT; and after the directional LBT with the random backoff succeeds, if a beam direction of the data to be subsequently transmitted is the same as a beam direction of a first transmission within the COT or is covered by a direction in which the LBT is performed for the first time, LBT without the random backoff is performed, or if the beam direction of the data to be subsequently transmitted is different from the beam direction of the first transmission, the directional LBT with the random backoff is performed.

Figure 9:
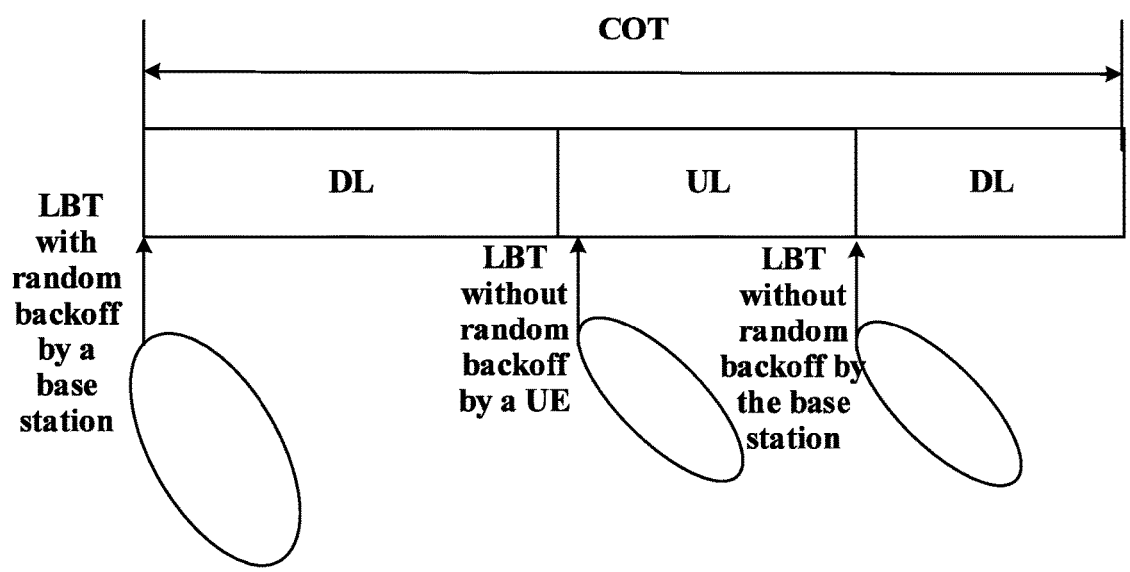
FIG. 9 is a diagram showing a type of LBT according to an embodiment of the present application.

As shown in FIG. 9 which is a diagram showing a type of LBT according to an embodiment of the present application, the base station initiates one COT to send downlink data by successfully performing LBT with the random backoff once in the direction of beam 1. Subsequently, within the COT, since the beam direction is similar to the beam direction in which the LBT is performed for the first time or covered by the first beam direction, the subordinate UE of the base station and the base station may perform the LBT without the random backoff before the data is sent.

Manner four: the base station or the UE performs the directional LBT without the random backoff at the beginning of the COT and subsequently.

Figure 10:
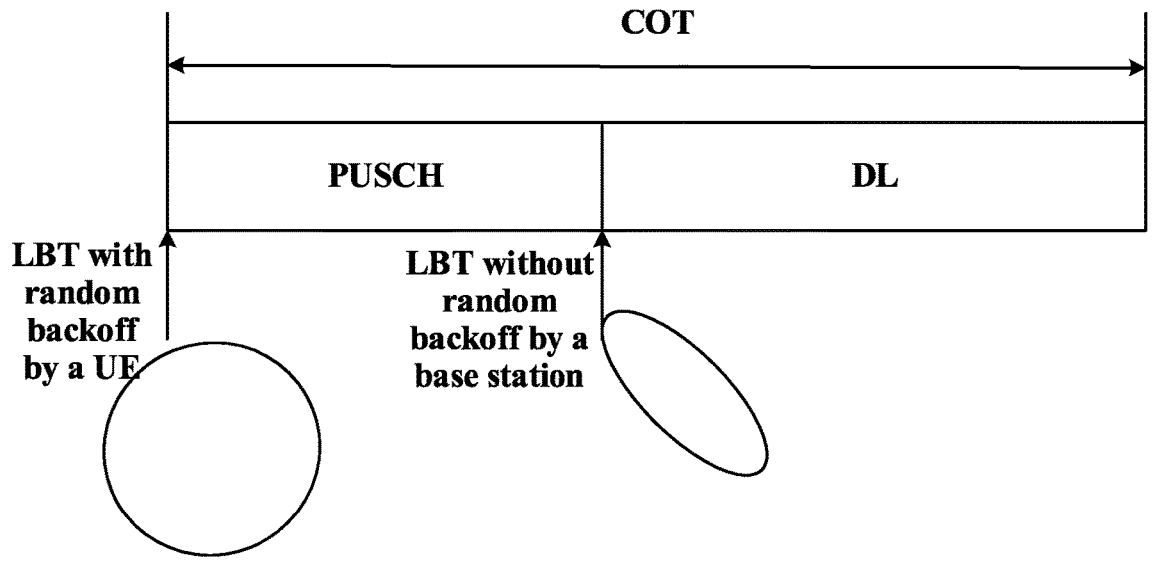
FIG. 10 is a diagram showing another type of LBT according to an embodiment of the present application.

Manner five: the UE performs the omni-directional LBT with the random backoff once; and subsequently, within the COT, when the base station has data to be sent or before the same UE sends uplink data, the directional LBT without the random backoff may be performed, as shown in FIG. 10 which is a diagram showing another type of LBT according to an embodiment of the present application.

The preceding manners one to five are applied to the same station, for example, the same UE or the same base station or may be applied in the case where the UE and the base station share the COT. That is, the station which performs the LBT successfully to initiate one COT may not be the same as a subsequent station, which may be a base station and its subordinate UE. Alternatively, a UE and a base station to which the UE belongs share one COT. The direction of the directional LBT is the same as or covers the beam direction of the data transmission scheduled each time, which is specifically determined through the spatial information parameter or the reference signal resource.

In an embodiment, the case where one PUSCH/PDSCH is sent in multiple beam directions at the same time may be processed by methods described below. For the transmission of an unlicensed carrier of a non-codebook PUSCH, the base station may schedule multiple beam directions for sending, which specifically includes two methods described below.

Method one: the multiple beam directions are beams prescheduled by the base station for a transmission. A beam direction in which the UE sends the PUSCH is selected based on an LBT result of each beam, and one or two beam directions are finally selected for sending the PUSCH. For example, the base station has priority information when configuring multiple SRS resources for the UE. When the UE successfully performs the LBT in the multiple beam directions, the UE selects beams with relatively high priorities for sending, and the base station performs detection according to configured priorities.

For example, if the base station configures three SRS resources for the UE and sorts the three SRS resources according to priorities of SRS1, SRS2, and SRS3, the UE performs the LBT in beam directions corresponding to the three SRS resources simultaneously or separately. If the LBT succeeds in merely one beam direction, the UE sends the PUSCH in this direction. If the LBT succeeds in two or three directions, the UE sends the PUSCH in a beam direction with a high priority according to an order of the priorities. For example, the UE performs the LBT successfully in both beam directions corresponding to SRS1 and SRS2, the UE selects the beam direction corresponding to SRS1 for sending the scheduled PUSCH.

Method two: the base station schedules different CBGs of one TB onto different layers. Each layer has a different beam direction. For example, a certain TB includes four CBGs, and finally, CBG1 is sent on beam 1, CBG2 is sent on beam2, CBG3 is sent on beam3, and CBG4 is sent on beam4 through a mapping of a coding and interleaving layer.

Figure 11:
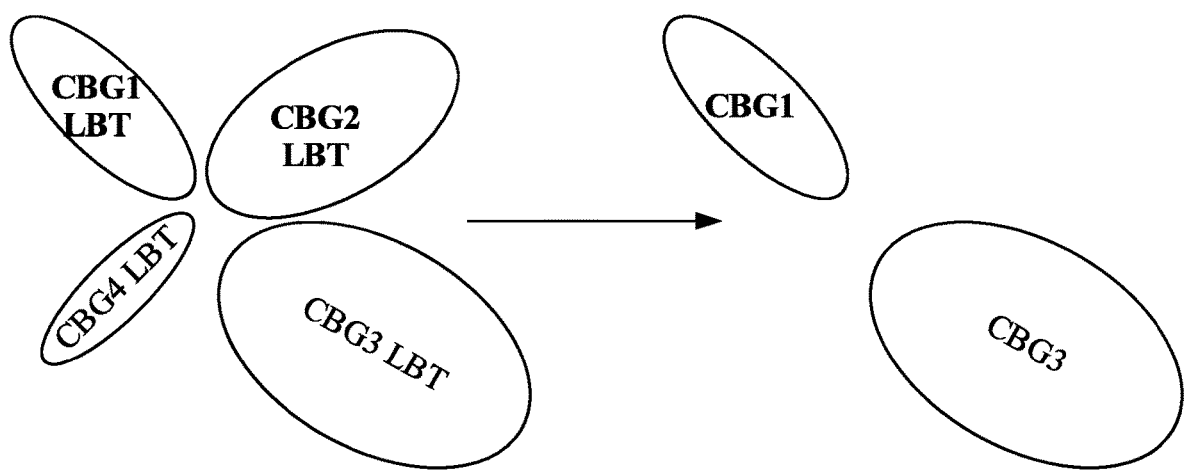
FIG. 11 is a diagram showing another type of LBT according to an embodiment of the present application.

The UE performs the LBT in the multiple beam directions and then the UE sends scheduled CBGs in corresponding beam directions in which the LBT succeeds. As shown in FIG. 11 which is a diagram showing another type of LBT according to an embodiment of the present application, the UE performs the LBT on four beams separately. As a result, the LBT succeeds in transmission directions of CBG1 and CBG3 while the LBT fails in directions of CBG2 and CBG4. Then, the UE sends merely CBG1 and CBG3. Subsequently, the base station may reschedule the retransmissions of CBG2 and CBG4. If CBG1 and CBG3 are transmitted correctly, rescheduling is not necessary.

The manner of the LBT in the beam direction mentioned in this embodiment is one of the preceding LBT manners one to five, and a predefined rule for determining which type is used is the same as that described in the preceding manners one to five. The method provided by the present embodiment solves the problem that in a high-frequency unlicensed carrier scenario, the data sending of an entire TB cannot be correctly decoded if the LBT performed in a certain beam direction fails.

FIG. 12 is a flowchart of another data transmission method according to an embodiment. As shown in FIG. 12, the method provided by this embodiment includes the following.

In S12010, downlink control signaling sent by a base station is received, where the downlink control signaling is used for scheduling at least one data transmission channel for a transmission over k resource units (RUs) indicated by transmission resource configuration information, the transmission resource configuration information includes configuration information about the k RUs, each RU includes N subcarriers and M consecutive slots, and k, N, and M are integers greater than or equal to 1.

The data transmission method provided by this embodiment is applied to a UE in a wireless communication system. In the wireless communication system, the UE accepts the scheduling of transmission resources by the base station, determines transmission resources used for an uplink data transmission channel or a downlink data transmission channel, and completes the sending or receiving of the uplink data transmission channel or the downlink data transmission channel.

In S12020, the at least one data transmission channel is transmitted over the k RUs indicated by the transmission resource configuration information according to the scheduling of the downlink control signaling.

The data transmission method provided by this embodiment is processing performed at a UE side in the embodiment shown in FIG. 1. The specific implementation method and the technical effect thereof have been described in detail in the embodiment shown in FIG. 1, and details are not described here again.

In an embodiment, based on the embodiment shown in FIG. 12, before the downlink control signaling sent by a base station is received, the method includes the following.

The transmission resource configuration information sent by the base station is received.

The transmission resource configuration information further includes at least one of: configuration information about RUs within one COT; information about an access type of the data transmission channel; or information about a spatial direction of the data transmission channel.

In an embodiment, based on the embodiment shown in FIG. 12, the method further includes the following.

A boundary of an end slot of each RU within the COT is received through RRC signaling, where the boundary is configured by the base station.

Receiving the downlink control signaling sent by the terminal includes the following.

An index of a start RU and a number of a start RU of the at least one data transmission channel scheduled within the COT are received, where the index and the number are scheduled through the downlink control signaling.

In an embodiment, based on the embodiment shown in FIG. 12, a time length occupied by the preset number of preceding RUs within the COT is less than a time length occupied by other RUs within the COT.

In an embodiment, based on the embodiment shown in FIG. 12, the configuration information about the RUs within the one COT is determined in one of the following manners: an SCS, a property and an occasion of a scheduled carrier, or a traffic type.

In an embodiment, based on the embodiment shown in FIG. 12, different CBGs of one TB in one data transmission channel are transmitted in different slots of one RU.

In an embodiment, based on the embodiment shown in FIG. 12, the transmission resource configuration information further includes:

configuration parameter information about a data transmission channel related to configuration information about RUs, where the configuration parameter information includes one of timing information about the data transmission channel related to the configuration information about the RUs, time domain resource allocation information about the data transmission channel related to the configuration information about the RUs, or codebook information about the data transmission channel related to the configuration information about the RUs.

In an embodiment, based on the embodiment shown in FIG. 12, the data transmission channel includes one of: a PUSCH, a PDSCH, a PUCCH, a PDCCH, or an SSB.

In an embodiment, based on the embodiment shown in FIG. 12, the information about the access type of the data transmission channel includes at least one of: omni-directional LBT with random backoff, omni-directional LBT without random backoff, directional LBT with random backoff, or directional LBT without random backoff.

In an embodiment, based on the embodiment shown in FIG. 12, a direction of directional LBT is the same as a spatial direction of a data transmission channel scheduled through the downlink control signaling, or a direction of directional LBT covers the spatial direction of the data transmission channel scheduled through the downlink control signaling.

In an embodiment, based on the embodiment shown in FIG. 12, data transmission channels have the same spatial direction.

The information about the access type of the data transmission channel includes: performing the directional LBT once in a spatial direction of the at least one data transmission channel before the at least one data transmission channel is transmitted.

In an embodiment, based on the embodiment shown in FIG. 12, the data transmission channels have different spatial directions.

The information about the access type of the data transmission channel includes: performing omni-directional LBT once in the spatial direction of the at least one data transmission channel before the at least one data transmission channel is transmitted.

In an embodiment, based on the embodiment shown in FIG. 12, when the data transmission channel is transmitted over multiple RUs of the one COT, the method further includes that the information about the access type of the channel is determined through one of manners described below.

Before sending the data transmission channel for the first time within the COT, the base station performs the omni-directional LBT with the random backoff once. If the omni-directional LBT with the random backoff succeeds, the base station or the UE performs the directional LBT or does not perform LBT before subsequently sending data transmission channels within the COT.

Before sending the data transmission channel for the first time within the COT, the base station performs the omni-directional LBT with the random backoff once. If the omni-directional LBT with the random backoff succeeds, when each of spatial directions in which data transmission channels are subsequently sent within the COT is the same as a spatial direction of the first data transmission channel or is covered by directions of the omni-directional LBT with the random backoff, LBT without the random backoff is performed or the LBT is not performed before the data transmission channels are subsequently sent within the COT. Otherwise, LBT with the random backoff is performed before the data transmission channels are subsequently sent within the COT.

The base station or the UE performs the directional LBT without the random backoff before the data transmission channel is sent each time within the COT.

Before sending the data transmission channel for the first time within the COT, the UE performs the omni-directional LBT with the random backoff once. If the omni-directional LBT with the random backoff succeeds, the base station or UE uses the directional LBT without the random backoff before subsequently sending the data transmission channels within the COT.

If a sum of widths of beams of data transmission channels sent by the base station multiple times within the COT is greater than a preset threshold, or the number of beams of the data transmission channels sent by the base station multiple times within the COT is greater than a preset threshold, the base station uses omni-directional LBT within the COT. Otherwise, the base station performs directional LBT for each data transmission channel.

In an embodiment, based on the embodiment shown in FIG. 12, a direction of the directional LBT with the random backoff or a direction of the directional LBT without the random backoff is the same as or covers a spatial direction of a data transmission channel scheduled each time.

In an embodiment, based on the embodiment shown in FIG. 12, information about the spatial direction is determined through a spatial information parameter or a reference signal resource.

In an embodiment, based on the embodiment shown in FIG. 12, transmitting the data transmission channel over the k RUs indicated by the transmission resource configuration information includes: performing LBT in multiple spatial directions for one data transmission channel, and transmitting the one data transmission channel in a spatial direction in which the LBT succeeds; or performing LBT in multiple spatial directions for one data transmission channel, and selecting a spatial direction with a highest priority from spatial directions in which the LBT succeeds to transmit the data transmission channel.

In an embodiment, based on the embodiment shown in FIG. 12, transmitting the data transmission channel over the k RUs indicated by the transmission resource configuration information includes: scheduling different CBGs of one TB of one data transmission channel onto different layers, and scheduling and sending the different CBGs in a spatial direction in which the LBT for the one data transmission channel succeeds.

In an embodiment, based on the embodiment shown in FIG. 12, that the step in which the data transmission channel is transmitted over the k RUs indicated by the transmission resource configuration information includes the following. A CBG scheduled and sent in a spatial direction in which the LBT fails is retransmitted in a spatial direction in which the LBT succeeds.

Alternatively, the CBG scheduled and sent in the spatial direction in which the LBT fails is retransmitted in a new time domain of the COT.

Alternatively, the CBG scheduled and sent in the spatial direction in which the LBT fails is retransmitted on a sub-band where the LBT succeeds within the COT.

FIG. 13 is a structural diagram of a data transmission apparatus according to an embodiment. As shown in FIG. 13, the data transmission apparatus provided by this embodiment is disposed in a base station and includes a configuration module 131 and a scheduling module 132.

The configuration module 131 is configured to configure transmission resource configuration information, where the transmission resource configuration information includes configuration information about k RUs, each RU includes N subcarriers and M consecutive slots, and k, N, and M are integers greater than or equal to 1. The scheduling module 132 is configured to schedule at least one data transmission channel through downlink control signaling for a transmission over the k RUs indicated by the transmission resource configuration information.

The data transmission apparatus provided by this embodiment is configured to implement the data transmission method in the embodiment shown in FIG. 1. The data transmission apparatus provided by this embodiment has similar implementation principles and technical effects, which are not repeated here.

FIG. 14 is a structural diagram of another data transmission apparatus according to an embodiment. As shown in FIG. 14, the data transmission apparatus provided by this embodiment is disposed in a UE and includes a receiving module 141 and a transmission module 142.

The receiving module 141 is configured to receive downlink control signaling sent by a base station, where the downlink control signaling is configured to schedule at least one data transmission channel for a transmission over k RUs indicated by transmission resource configuration information, the transmission resource configuration information includes configuration information about the k RUs, each RU includes N subcarriers and M consecutive slots, and k, N, and M are integers greater than or equal to 1. The transmission module 142 is configured to transmit the at least one data transmission channel over the k RUs indicated by the transmission resource configuration information according to the scheduling of the downlink control signaling.

The data transmission apparatus provided by this embodiment is configured to implement the data transmission method in the embodiment shown in FIG. 12. The data transmission apparatus provided by this embodiment has similar implementation principles and technical effects, which are not repeated here.

FIG. 15 is a structural diagram of a data transmission system according to an embodiment. As shown in FIG. 15, the data transmission system provided by this embodiment includes a base station 151 and a UE 152. The base station 151 includes the data transmission apparatus as shown in FIG. 13, and the UE 152 includes the data transmission apparatus as shown in FIG. 14.

Figure 16:
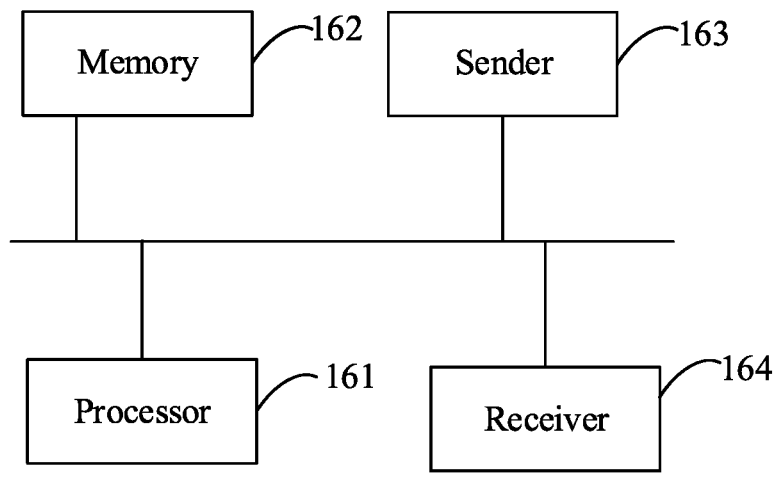
FIG. 16 is a structural diagram of a base station according to an embodiment.

FIG. 16 is a structural diagram of a base station according to an embodiment. As shown in FIG. 16, the base station includes a processor 161, a memory 162, a sender 163, and a receiver 164. The number of processors 161 in the base station may be one or more, and one processor 161 is used as an example in FIG. 16. The processor 161 and the memory 162 in the base station may be connected through a bus or in other manners. In FIG. 16, the connection through the bus is used as an example.

The memory 162, as a computer-readable storage medium, may be configured to store software programs and computer-executable programs, and modules such as program instructions/modules corresponding to the data transmission method in the embodiment of the present application in FIG. 1 or FIG. 2 (for example, the configuration module 131 and the scheduling module 132 in the data transmission apparatus). The processor 161 executes software programs, instructions, and modules stored in the memory 162 so that at least one function application and data processing of the base station is implemented, that is, the preceding data transmission method is implemented.

The memory 162 may mainly include a program storage region and a data storage region. The program storage region may store an operating system and an application program required for at least one function, and the data storage region may store data or the like created according to the use of the terminal. In addition, the memory 162 may include a high-speed random-access memory and may also include a non-volatile memory such as at least one magnetic disk memory, flash memory, or other non-volatile solid-state memory.

The sender 163 is a combination of modules or devices capable of transmitting radio frequency signals into space and includes, for example, a combination of a radio frequency transmitter, an antenna, and another device. The receiver 164 is a combination of modules or devices capable of receiving radio frequency signals from space and includes, for example, a combination of a radio frequency receiver, an antenna, and another device.

Figure 17:
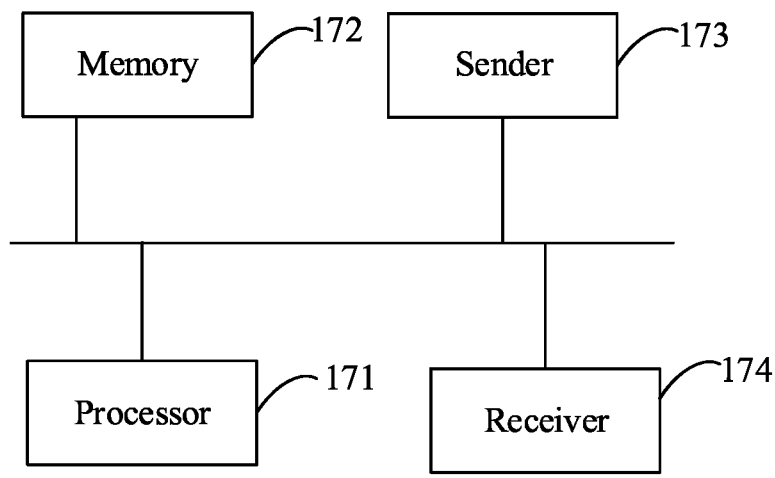
FIG. 17 is a structural diagram of a UE according to an embodiment.

FIG. 17 is a structural diagram of a UE according to an embodiment. As shown in FIG. 17, the UE includes a processor 171, a memory 172, a sender 173, and a receiver 174. The number of processors 171 in the UE may be one or more, and one processor 171 is used as an example in FIG. 17. The processor 171 and the memory 172 in the UE may be connected through a bus or in other manners. In FIG. 17, the connection through the bus is used as an example.

The memory 172, as a computer-readable storage medium, may be configured to store software programs and computer-executable programs and modules such as program instructions/modules corresponding to the data transmission method in the embodiment of the present application in FIG. 12 (for example, the receiving module 141 and the transmission module 142 in the data transmission apparatus). The processor 171 executes software programs, instructions, and modules stored in the memory 172 so that at least one function application and data processing of the UE is implemented, that is, the preceding data transmission method is implemented.

The memory 172 may mainly include a program storage region and a data storage region. The program storage region may store an operating system and an application program required for at least one function, and the data storage region may store data or the like created according to the use of the base station. In addition, the memory 172 may include a high-speed random-access memory and may also include a non-volatile memory such as at least one magnetic disk memory, flash memory, or other non-volatile solid-state memory.

The sender 173 is a combination of modules or devices capable of transmitting radio frequency signals into space and includes, for example, a combination of a radio frequency transmitter, an antenna, and another device. The receiver 174 is a combination of modules or devices capable of receiving radio frequency signals from space and includes, for example, a combination of a radio frequency receiver, an antenna, and another device.

An embodiment of the present application further provides a storage medium including computer-executable instructions for performing a data transmission method when executed by a computer processor. The method includes the following. Transmission resource configuration information is configured, where the transmission resource configuration information includes configuration information about k RUs, each RU includes N subcarriers and M consecutive slots, and k, N, and M are integers greater than or equal to 1. At least one data transmission channel is scheduled through downlink control signaling for a transmission over the k RUs indicated by the transmission resource configuration information.

An embodiment of the present application further provides a storage medium including computer-executable instructions for performing a data transmission method when executed by a computer processor. The method includes the following. Downlink control signaling sent by a base station is received, where the downlink control signaling is configured to schedule at least one data transmission channel for a transmission over k RUs indicated by transmission resource configuration information, the transmission resource configuration information includes configuration information about the k RUs, each RU includes N subcarriers and M consecutive slots, and k, N, and M are integers greater than or equal to 1. The at least one data transmission channel is transmitted over the k RUs indicated by the transmission resource configuration information according to the scheduling of the downlink control signaling.

The above are merely exemplary embodiments of the present application and are not intended to limit the scope of the present application.

It is to be understood by those skilled in the art that the term user terminal encompasses any suitable type of wireless user device such as a mobile phone, a portable data processing device, a portable web browser, or a vehicle-mounted mobile station.

Generally, various embodiments of the present application may be implemented in hardware, a dedicated circuit, software, logics, or any combination thereof. For example, some aspects may be implemented in hardware while other aspects may be implemented in firmware or software executable by a controller, a microprocessor, or other computing devices, although the present application is not limited thereto.

The embodiments of the present application may be implemented through the execution of computer program instructions by a data processor of a mobile device, for example, implemented in a processor entity, hardware, or a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, or may represent interconnected logic circuits, modules, and functions, or may represent a combination of program steps and logic circuits, modules, and functions. Computer programs may be stored on a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. A data transmission method, applied to a base station, comprising:
    configuring transmission resource configuration information, wherein the transmission resource configuration information comprises configuration information about k resource units (RUS), each of the k RUs comprises N subcarriers and M consecutive slots, and k, N, and M are integers greater than or equal to 1; and
    scheduling at least one data transmission channel through downlink control signaling for a transmission over the k RUs indicated by the transmission resource configuration information;
    wherein before the scheduling the at least one data transmission channel through the downlink control signaling for the transmission over the k RUs indicated by the transmission resource configuration information, the method further comprises:
    sending the transmission resource configuration information to a user equipment (UE);
    wherein the transmission resource configuration information further comprises
    configuration information about RUs within one channel occupancy time (COT);
    wherein the configuration information about the RUs within the one COT is determined in one of the following manners: a subcarrier spacing (SCS), a property and an occasion of a scheduled carrier, or a traffic type.

2. The method according to claim 1, wherein the transmission resource configuration information further comprises information about an access type of the at least one data transmission channel, and the access type comprises at least one of: omni-directional Listen Before Talk (LBT) with random backoff, omni-directional LBT without random backoff, directional LBT with random backoff, or directional LBT without random backoff.

3. The method according to claim 2, wherein in a case where the at least one data transmission channel is transmitted over a plurality of RUs within the one COT, the method further comprises: determining the information about the access type of the at least one data transmission channel in one of the following manners:
    the base station performs the omni-directional LBT with the random backoff once before sending the at least one data transmission channel for a first time within the one COT, and in a case where the omni-directional LBT with the random backoff succeeds, the base station or the UE performs directional LBT or does not perform LBT before subsequently sending the at least one data transmission channel within the one COT;
    the base station performs the omni-directional LBT with the random backoff once before sending the at least one data transmission channel for a first time within the one COT, and in a case where the omni-directional LBT with the random backoff succeeds and a spatial direction in which the at least one data transmission channel is subsequently sent within the one COT is the same as a spatial direction of a first data transmission channel or is covered by directions of the omni-directional LBT with the random backoff, LBT without the random backoff is performed or LBT is not performed before the at least one data transmission channel is subsequently sent within the one COT, or in a case where the omni-directional LBT with the random backoff succeeds and a spatial direction in which the at least one data transmission channel is subsequently sent within the one COT is different from a spatial direction of a first data transmission channel or is not covered by directions of the omni-directional LBT with the random backoff, LBT with the random backoff is performed before the at least one data transmission channel is subsequently sent within the one COT;

the base station or the UE performs the directional LBT without the random backoff before sending the at least one data transmission channel each time within the one COT;

the UE performs the omni-directional LBT with the random backoff once before sending the at least one data transmission channel for a first time within the one COT, and in a case where the omni-directional LBT with the random backoff succeeds, the base station or the UE uses the directional LBT without the random backoff before subsequently sending the at least one data transmission channel within the one COT; and in a case where a sum of widths of beams of the at least one data transmission channel sent by the base station multiple times within the one COT is greater than a preset threshold or a number of beams of the at least one data transmission channel sent by the base station multiple times within the one COT is greater than a preset threshold, the base station uses omni-directional LBT within the one COT; or in a case where a sum of widths of beams of the at least one data transmission channel sent by the base station multiple times within the one COT is not greater than a preset threshold or a number of beams of the at least one data transmission channel sent by the base station multiple times within the one COT is not greater than a preset threshold, the base station performs directional LBT for each of the at least one data transmission channel.

4. The method according to claim 2, wherein the transmission of the at least one data transmission channel over the k RUs indicated by the transmission resource configuration information comprises: performing LBT in a plurality of spatial directions for one data transmission channel among the at least one data transmission channel, and transmitting the one data transmission channel in a spatial direction in which the LBT succeeds; or performing LBT in a plurality of spatial directions for one data transmission channel among the at least one data transmission channel, and selecting a spatial direction with a highest priority from spatial directions in which the LBT succeeds to transmit the one data transmission channel.

5. The method according to claim 4, wherein the transmission of the at least one data transmission channel over the k RUs indicated by the transmission resource configuration information comprises: retransmitting, in a spatial direction in which the LBT succeeds, a CBG scheduled and sent in a spatial direction in which the LBT fails; retransmitting, in a new time domain of the one COT, a CBG scheduled and sent in a spatial direction in which the LBT fails; or retransmitting, on a sub-band where the LBT succeeds within the one COT, a CBG scheduled and sent in a spatial direction in which the LBT fails.

6. A data transmission apparatus, the apparatus being disposed in a base station and comprising:
at least one processor;
a memory, which is configured to store programs executable by the at least one processor;
wherein the at least one processor is configured to execute the programs, when executed, perform the method of claim 1.

7. A data transmission method, applied to a user equipment (UE), comprising:
receiving downlink control signaling sent by a base station, wherein the downlink control signaling is used for scheduling at least one data transmission channel for a transmission over k resource units (RUs) indicated by transmission resource configuration information, the transmission resource configuration information comprises configuration information about the k RUs, each of the k RUs comprises N subcarriers and M consecutive slots, and k, N, and M are integers greater than or equal to 1; and transmitting the at least one data transmission channel over the k RUs indicated by the transmission resource configuration information according to scheduling of the downlink control signaling;

wherein before the receiving the downlink control signaling sent by the base station, the method further comprises:

receiving the transmission resource configuration information sent by the base station;

wherein the transmission resource configuration information further comprises configuration information about RUs within one channel occupancy time (COT);

wherein the configuration information about the RUs within the one COT is determined in one of the following manners: a subcarrier spacing (SCS), a property and an occasion of a scheduled carrier, or a traffic type.

8. The method according to claim 7, wherein the transmission resource configuration information further comprises:
configuration parameter information about a data transmission channel related to configuration information about RUs;
wherein the configuration parameter information comprises one of: timing information about the data transmission channel related to the configuration information about the RUs, time domain resource allocation information about the data transmission channel related to the configuration information about the RUs, or codebook information about the data transmission channel related to the configuration information about the RUs.

9. The method according to claim 7, wherein the transmission resource configuration information further comprises information about an access type of the at least one data transmission channel, and the access type comprises at least one of: omni-directional Listen Before Talk (LBT) with random backoff, omni-directional LBT without random backoff, directional LBT with random backoff, or directional LBT without random backoff.

10. The method according to claim 9, wherein in a case where the at least one data transmission channel is transmitted over a plurality of RUs within the one COT, the method further comprises: determining the information about the access type of the at least one data transmission channel in one of the following manners:
the base station performs the omni-directional LBT with the random backoff once before sending the at least one data transmission channel for a first time within the one COT, and in a case where the omni-directional LBT with the random backoff succeeds, the base station or the UE performs directional LBT or does not perform LBT before subsequently sending the at least one data transmission channel within the one COT;

the base station performs the omni-directional LBT with the random backoff once before sending the at least one data transmission channel for a first time within the one COT, and in a case where the omni-directional LBT with the random backoff succeeds and a spatial direction in which the at least one data transmission channel is subsequently sent within the one COT is the same as a spatial direction of a first data transmission channel or is covered by directions of the omni-directional LBT with the random backoff, LBT without the random backoff is performed or LBT is not performed before the at least one data transmission channel is subsequently sent within the one COT, or in a case where the omni-directional LBT with the random backoff succeeds and a spatial direction in which the at least one data transmission channel is subsequently sent within the one COT is different from a spatial direction of a first data transmission channel or is not covered by directions of the omni-directional LBT with the random backoff, LBT with the random backoff is performed before the at least one data transmission channel is subsequently sent within the one COT;

the base station or the UE performs the directional LBT without the random backoff before sending the at least one data transmission channel each time within the one COT;

the UE performs the omni-directional LBT with the random backoff once before sending the at least one data transmission channel for a first time within the one COT, and in a case where the omni-directional LBT with the random backoff succeeds, the base station or the UE uses the directional LBT without the random backoff before subsequently sending the at least one data transmission channel within the one COT; and in a case where a sum of widths of beams of the at least one data transmission channel sent by the base station multiple times within the one COT is greater than a preset threshold or a number of beams of the at least one data transmission channel sent by the base station multiple times within the one COT is greater than a preset threshold, the base station uses omni-directional LBT within the one COT; or in a case where a sum of widths of beams of the at least one data transmission channel sent by the base station multiple times within the one COT is not greater than a preset threshold or a number of beams of the at least one data transmission channel sent by the base station multiple times within the one COT is not greater than a preset threshold, the base station performs directional LBT for each of the at least one data transmission channel.

11. The method according to claim 7, wherein the transmitting the at least one data transmission channel over the k RUs indicated by the transmission resource configuration information comprises:

performing LBT in a plurality of spatial directions for one data transmission channel among the at least one data transmission channel, and transmitting the one data transmission channel in a spatial direction in which the LBT succeeds; or performing LBT in a plurality of spatial directions for one data transmission channel among the at least one data transmission channel, and selecting a spatial direction with a highest priority from spatial directions in which the LBT succeeds to transmit the one data transmission channel.

12. The method according to claim 11, wherein the transmitting the at least one data transmission channel over the k RUs indicated by the transmission resource configuration information comprises:

retransmitting, in a spatial direction in which the LBT succeeds, a CBG scheduled and sent in a spatial direction in which the LBT fails;

retransmitting, in a new time domain of the one COT, a CBG scheduled and sent in a spatial direction in which the LBT fails; or retransmitting, on a sub-band where the LBT succeeds within the one COT, a CBG scheduled and sent in a spatial direction in which the LBT fails.

13. A data transmission apparatus, the apparatus being disposed in a user equipment (UE) and comprising:

at least one processor;

a memory, which is configured to store programs executable by the at least one processor;

wherein the at least one processor is configured to execute the programs, when executed, perform the method of claim 7.

* * * * *